US010906657B2

(12) United States Patent
Schwarz et al.

(10) Patent No.: US 10,906,657 B2
(45) Date of Patent: Feb. 2, 2021

(54) AIRCRAFT SYSTEM WITH DISTRIBUTED PROPULSION

(71) Applicant: United Technologies Corporation, Farmington, CT (US)

(72) Inventors: Frederick M. Schwarz, Glastonbury, CT (US); William G. Sheridan, Southington, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 297 days.

(21) Appl. No.: 16/012,047

(22) Filed: Jun. 19, 2018

(65) Prior Publication Data

US 2019/0382121 A1 Dec. 19, 2019

(51) Int. Cl.
*B64D 27/02* (2006.01)
*B64D 27/12* (2006.01)
*B64D 27/24* (2006.01)
*B64D 31/14* (2006.01)
*B64D 33/04* (2006.01)
*F02C 6/20* (2006.01)
(Continued)

(52) U.S. Cl.
CPC ............. *B64D 27/02* (2013.01); *B64D 27/12* (2013.01); *B64D 27/24* (2013.01); *B64D 31/02* (2013.01); *B64D 31/14* (2013.01); *B64D 33/04* (2013.01); *F02C 6/14* (2013.01); *F02C 6/20* (2013.01); *H02K 7/1823* (2013.01); *H02K 7/20* (2013.01); *H02K 11/0094* (2013.01); *B64D 2027/026* (2013.01); *F05D 2220/323* (2013.01); *F05D 2220/76* (2013.01)

(58) Field of Classification Search
CPC .. B64D 2027/026; B64D 27/02; B64D 27/12; B64D 27/24; B64D 31/02; B64D 31/14; B64D 33/04; F02C 6/02; F02C 6/14; F02C 6/20; F02C 7/36; F02C 9/42; F02K 3/06; F02K 3/062; F02K 5/00; F05D 2220/323; F05D 2220/76; F05D 2270/13; H02K 11/0094; H02K 7/1823; H02K 7/20
See application file for complete search history.

(56) References Cited

U.S. PATENT DOCUMENTS 2,604,276 A * 7/1952 Huben .................... F02C 6/20
244/15
2,964,264 A * 12/1960 Multhopp ............ B64C 23/005
244/12.4
(Continued)

FOREIGN PATENT DOCUMENTS

GB 2542184 A 3/2017

OTHER PUBLICATIONS

Wikipedia, Balanced field takeoff, Apr. 10, 2015, http://web.archive.org/web/20150410233242/https://en.wikipedia.org/wiki/Balanced_field_takeoff; (Year: 2015), 1 page.
(Continued)

*Primary Examiner* — Medhat Badawi
(74) *Attorney, Agent, or Firm* — Cantor Colburn LLP

(57) ABSTRACT

A propulsion system for an aircraft includes at least two gas turbine engines and at least one auxiliary propulsion fan. The at least one auxiliary propulsion fan is configured to selectively receive a motive force from either or both of the at least two gas turbine engines through at least one shaft operatively coupled to the at least one auxiliary propulsion fan.

18 Claims, 6 Drawing Sheets

(51) Int. Cl.
  *B64D 31/02* (2006.01)
  *H02K 7/18* (2006.01)
  *H02K 7/20* (2006.01)
  *H02K 11/00* (2016.01)
  *F02C 6/14* (2006.01)

(56) References Cited

U.S. PATENT DOCUMENTS

| | | | | |
|---|---|---|---|---|
| 2,988,301 A * | 6/1961 | Fletcher | B64C 29/0025 | 244/12.3 |
| 3,018,987 A * | 1/1962 | Multhopp | B64C 23/005 | 244/52 |
| 3,054,577 A * | 9/1962 | Wolf | F02K 3/062 | 60/226.1 |
| 3,073,547 A * | 1/1963 | Fischer | B64C 29/0033 | 244/7 C |
| 3,081,964 A * | 3/1963 | Quenzler | B64C 29/0033 | 244/7 R |
| 3,109,614 A * | 11/1963 | Steidl | B64D 27/20 | 244/87 |
| 3,136,499 A * | 6/1964 | Kessler | B64C 29/0033 | 244/7 C |
| 3,181,810 A * | 5/1965 | Olson | B64C 29/0033 | 244/7 R |
| 3,194,516 A * | 7/1965 | Messerschmitt | B64D 27/20 | 244/74 |
| 3,255,825 A * | 6/1966 | Mouille | B64C 27/12 | 416/170 R |
| 3,415,468 A * | 12/1968 | Labombarde | B64C 11/00 | 244/13 |
| 3,417,946 A * | 12/1968 | Hartley | B64C 5/02 | 244/87 |
| 3,576,300 A * | 4/1971 | Palfreyman | B64D 27/20 | 244/36 |
| 3,592,415 A * | 7/1971 | Walley | B64C 1/00 | 244/55 |
| 3,643,439 A * | 2/1972 | Petersen | F02K 3/12 | 60/225 |
| 3,820,746 A * | 6/1974 | Vedova | B64C 29/0016 | 244/55 |
| 3,946,554 A * | 3/1976 | Neumann | F01D 17/162 | 60/204 |
| 3,972,490 A * | 8/1976 | Zimmermann | B64C 29/0016 | 244/12.3 |
| 3,995,794 A * | 12/1976 | Lanier | B64C 15/02 | 244/12.4 |
| 4,030,688 A * | 6/1977 | Pellarini | B64C 39/00 | 244/13 |
| 4,050,651 A * | 9/1977 | Neal | B64C 3/14 | 244/15 |
| 4,149,688 A * | 4/1979 | Miller, Jr. | B64C 29/0033 | 244/12.4 |
| D264,838 S * | 6/1982 | Dornier | | D12/324 |
| 4,387,866 A * | 6/1983 | Eickmann | H01F 41/08 | 244/123.9 |
| 4,447,022 A * | 5/1984 | Lion | B64C 5/02 | 244/1 N |
| 4,492,353 A * | 1/1985 | Phillips | B64C 29/0075 | 244/12.4 |
| 4,531,620 A * | 7/1985 | Stone | F16D 41/086 | 192/38 |
| 4,605,185 A * | 8/1986 | Reyes | B64D 27/24 | 244/55 |
| 4,917,332 A * | 4/1990 | Patterson, Jr. | B64C 23/065 | 244/58 |
| 4,925,131 A * | 5/1990 | Eickmann | B64C 11/28 | 244/123.9 |
| D308,663 S * | 6/1990 | Carlson | | D12/337 |
| 4,953,812 A * | 9/1990 | Van der Hoeven | B64D 27/14 | 244/119 |
| 4,966,338 A * | 10/1990 | Gordon | B64C 23/06 | 244/130 |
| 4,976,396 A * | 12/1990 | Carlson | B64C 1/16 | 244/119 |
| 4,982,914 A * | 1/1991 | Eickmann | B64C 11/28 | 244/54 |
| 5,096,142 A * | 3/1992 | Rodriguez | B64C 7/00 | 244/130 |
| 5,115,996 A * | 5/1992 | Moller | B64C 29/0025 | 239/265.19 |
| 5,443,229 A * | 8/1995 | O'Brien | B64D 27/20 | 244/54 |
| 5,779,191 A * | 7/1998 | Brislawn | B64C 5/02 | 244/194 |
| 5,957,405 A * | 9/1999 | Williams | B64C 1/00 | 244/15 |
| 6,134,876 A * | 10/2000 | Hines | F02C 3/10 | 60/39.41 |
| 6,394,389 B1 * | 5/2002 | Saiz | B64C 7/02 | 244/91 |
| 6,575,406 B2 * | 6/2003 | Nelson | B64C 1/0009 | 244/119 |
| 6,612,522 B1 * | 9/2003 | Aldrin | B64G 1/002 | 244/159.3 |
| 6,688,552 B2 * | 2/2004 | Franchet | F02C 7/36 | 244/12.3 |
| 6,824,092 B1 * | 11/2004 | Franklin, III | B64C 30/00 | 244/1 N |
| 6,834,495 B2 * | 12/2004 | Saito | F02C 3/10 | 60/224 |
| 6,921,045 B2 * | 7/2005 | Chang | B64C 3/16 | 244/15 |
| 7,107,756 B2 * | 9/2006 | Rolt | F02K 3/06 | 60/224 |
| 7,900,865 B2 * | 3/2011 | Moore | B64C 39/12 | 244/1 N |
| 7,900,868 B2 * | 3/2011 | Sankrithi | B64C 3/10 | 244/1 N |
| 7,905,449 B2 * | 3/2011 | Cazals | B64C 5/06 | 244/53 R |
| 7,926,760 B2 * | 4/2011 | Gall | B64C 3/10 | 244/1 N |
| 7,967,243 B2 * | 6/2011 | Verde Preckler | B64C 15/12 | 244/56 |
| 8,011,613 B2 * | 9/2011 | Belleville | B64D 27/14 | 244/1 N |
| 8,015,796 B2 * | 9/2011 | Babu | F01D 13/003 | 60/226.1 |
| 8,074,924 B2 * | 12/2011 | Cros | B64C 5/06 | 244/13 |
| 8,167,239 B2 * | 5/2012 | Guering | B64D 27/02 | 244/54 |
| 8,256,709 B2 * | 9/2012 | Negulescu | B64D 27/08 | 244/54 |
| 8,313,055 B2 * | 11/2012 | Gall | B64D 27/02 | 244/1 N |
| 8,322,655 B1 * | 12/2012 | Kismarton | B64C 5/02 | 244/119 |
| 8,393,567 B2 * | 3/2013 | Moore | B64D 27/14 | 244/55 |
| 8,544,787 B2 * | 10/2013 | Lee | B64C 29/0033 | 244/12.4 |
| 8,573,531 B2 * | 11/2013 | Cazals | B64D 27/20 | 244/54 |
| 8,579,230 B2 * | 11/2013 | Diochon | B64D 29/04 | 244/54 |
| 8,628,040 B2 * | 1/2014 | Moore | B64C 5/08 | 244/1 N |
| 8,632,032 B2 * | 1/2014 | Butler | B64D 29/04 | 244/54 |
| 8,651,414 B2 * | 2/2014 | Cazals | B64C 1/068 | 244/13 |
| 8,684,302 B2 * | 4/2014 | Chanez | B64C 1/0009 | 244/53 B |
| 8,720,815 B2 * | 5/2014 | Vetters | B64D 27/10 | 244/54 |
| 9,266,605 B2 * | 2/2016 | Richter | B64D 45/0005 | |
| 9,346,551 B2 * | 5/2016 | Stretton | B64D 27/14 | |

(56) References Cited

U.S. PATENT DOCUMENTS

| | | | | |
|---|---|---|---|---|
| 9,475,579 | B2* | 10/2016 | Fredericks | B64C 25/52 |
| 9,493,245 | B2* | 11/2016 | Salyer | B64C 27/04 |
| 9,540,113 | B2* | 1/2017 | Gukeisen | F02K 1/70 |
| 9,567,062 | B2* | 2/2017 | Chandler | B64C 39/10 |
| 9,573,693 | B2* | 2/2017 | Cazals | B64D 27/20 |
| 9,701,395 | B2* | 7/2017 | Veilleux, Jr. | B64C 11/48 |
| 9,764,848 | B1* | 9/2017 | Vondrell | F01D 15/10 |
| 9,821,917 | B2 | 11/2017 | Becker et al. | |
| 9,834,305 | B2* | 12/2017 | Taylor | B64C 27/54 |
| 9,845,159 | B2* | 12/2017 | Suciu | B64D 27/20 |
| 9,884,687 | B2* | 2/2018 | Marrinan | B64C 1/16 |
| 9,914,528 | B2* | 3/2018 | Hirano | B64C 11/46 |
| 9,957,042 | B1* | 5/2018 | Vander Lind | B64C 29/0033 |
| 9,957,055 | B2 | 5/2018 | Marrinan et al. | |
| 9,975,631 | B1* | 5/2018 | McLaren | B64C 29/0033 |
| 10,071,801 | B2* | 9/2018 | North | B64C 25/52 |
| 10,106,265 | B2* | 10/2018 | Yao | B64D 27/18 |
| 10,107,500 | B2* | 10/2018 | O'Flarity | F02C 3/107 |
| 10,112,696 | B2* | 10/2018 | Chandler | B64D 25/00 |
| 10,267,263 | B2* | 4/2019 | Lord | B64D 27/14 |
| 10,287,991 | B2* | 5/2019 | Suciu | F02C 7/36 |
| 10,435,163 | B2* | 10/2019 | Gallet | F02C 6/02 |
| 10,450,079 | B2* | 10/2019 | Beutin | B64C 3/32 |
| 2001/0011691 | A1* | 8/2001 | Provost | B64D 27/12 244/55 |
| 2002/0189230 | A1* | 12/2002 | Franchet | F02K 3/025 60/204 |
| 2006/0011780 | A1* | 1/2006 | Brand | B64D 35/04 244/60 |
| 2007/0102575 | A1* | 5/2007 | Morgan | B64C 9/06 244/87 |
| 2008/0048065 | A1* | 2/2008 | Kuntz | B64C 39/024 244/17.23 |
| 2008/0098719 | A1* | 5/2008 | Addis | B64D 27/10 60/226.1 |
| 2008/0099632 | A1* | 5/2008 | Addis | B64D 27/14 244/53 B |
| 2008/0245925 | A1* | 10/2008 | Udall | F02K 1/008 244/52 |
| 2009/0229243 | A1* | 9/2009 | Guemmer | F02K 3/077 60/226.1 |
| 2010/0212288 | A1* | 8/2010 | Suchezky | F02K 1/44 60/228 |
| 2011/0150645 | A1* | 6/2011 | Moore | B64C 11/48 416/1 |
| 2011/0184623 | A1* | 7/2011 | De Boer | B64D 31/12 701/99 |
| 2011/0315809 | A1* | 12/2011 | Oliver | B64D 27/12 244/12.4 |
| 2012/0128487 | A1* | 5/2012 | Eames | F01D 15/12 416/1 |
| 2014/0021292 | A1* | 1/2014 | West | B64F 5/10 244/54 |
| 2014/0117152 | A1* | 5/2014 | Suciu | F02C 7/36 244/54 |
| 2014/0119903 | A1* | 5/2014 | Suciu | F01D 25/08 415/177 |
| 2014/0130512 | A1* | 5/2014 | Chouard | B64D 27/26 60/797 |
| 2014/0183296 | A1* | 7/2014 | Suciu | F02K 3/06 244/54 |
| 2014/0260182 | A1* | 9/2014 | Suciu | F02C 7/052 60/224 |
| 2014/0360206 | A1* | 12/2014 | Bradbrook | B64D 27/24 60/797 |
| 2015/0144742 | A1* | 5/2015 | Moxon | B64D 27/10 244/215 |
| 2015/0226117 | A1* | 8/2015 | Suciu | B64D 35/04 60/726 |
| 2015/0284067 | A1* | 10/2015 | Suciu | B64D 27/14 244/87 |
| 2015/0292411 | A1* | 10/2015 | Suciu | F02C 7/20 60/805 |
| 2015/0298794 | A1* | 10/2015 | Suciu | B64C 5/06 244/45 R |
| 2015/0298814 | A1* | 10/2015 | Suciu | F02K 1/62 244/110 B |
| 2016/0010589 | A1* | 1/2016 | Rolt | F02C 7/143 60/226.1 |
| 2016/0017844 | A1* | 1/2016 | Suciu | F02K 1/60 244/53 B |
| 2016/0076447 | A1* | 3/2016 | Merlo | F02C 5/00 60/39.12 |
| 2016/0144966 | A1* | 5/2016 | Trahmer | B64C 9/16 244/13 |
| 2016/0152318 | A1* | 6/2016 | Alexander | B64C 3/32 244/13 |
| 2016/0229532 | A1* | 8/2016 | Shapery | B64C 29/0075 |
| 2016/0236790 | A1* | 8/2016 | Knapp | G08G 5/0021 |
| 2016/0355272 | A1* | 12/2016 | Moxon | B64D 27/02 |
| 2016/0355275 | A1* | 12/2016 | Seger | B64D 41/00 |
| 2016/0356225 | A1* | 12/2016 | Sheridan | F02C 7/36 |
| 2017/0081034 | A1* | 3/2017 | Marrinan | B64D 33/02 |
| 2017/0081035 | A1* | 3/2017 | Becker | B64D 27/20 |
| 2017/0101191 | A1* | 4/2017 | Becker | B64D 27/18 |
| 2017/0121031 | A1* | 5/2017 | Stieger | B64D 33/02 |
| 2017/0129617 | A1* | 5/2017 | Shah | B64D 27/24 |
| 2017/0137134 | A1* | 5/2017 | Vessot | B64D 33/02 |
| 2017/0137135 | A1* | 5/2017 | Chanez | F02K 1/52 |
| 2017/0167437 | A1* | 6/2017 | Cazals | B64D 27/14 |
| 2017/0233060 | A1* | 8/2017 | Glover | B64D 27/20 244/54 |
| 2017/0291693 | A1* | 10/2017 | Niergarth | B64C 21/06 |
| 2017/0297727 | A1* | 10/2017 | Niergarth | F02C 7/36 |
| 2017/0297728 | A1* | 10/2017 | Niergarth | B64D 27/12 |
| 2017/0313430 | A1* | 11/2017 | Pautis | B64D 27/20 |
| 2017/0361939 | A1* | 12/2017 | Negulescu | B64D 29/04 |
| 2017/0369179 | A1* | 12/2017 | Bradbrook | F02C 7/18 |
| 2018/0037331 | A1* | 2/2018 | Suciu | B64D 27/14 |
| 2018/0043997 | A1* | 2/2018 | Ramakrishnan | B64D 33/02 |
| 2018/0050810 | A1* | 2/2018 | Niergarth | F04D 29/056 |
| 2018/0050811 | A1* | 2/2018 | Niergarth | B64D 33/08 |
| 2018/0051654 | A1* | 2/2018 | Suciu | F02C 7/36 |
| 2018/0051701 | A1* | 2/2018 | Kupiszewski | F02C 7/32 |
| 2018/0057150 | A1* | 3/2018 | Cheung | B64C 1/16 |
| 2018/0065743 | A1* | 3/2018 | Vondrell | B64C 29/00 |
| 2018/0080378 | A1* | 3/2018 | Alecu | F02C 6/20 |
| 2018/0087396 | A1* | 3/2018 | van der Merwe | F04D 19/02 |
| 2018/0093754 | A1* | 4/2018 | Cheung | B64D 27/24 |
| 2018/0093777 | A1* | 4/2018 | Cheung | B64D 29/04 |
| 2018/0127089 | A1* | 5/2018 | Welstead | B60L 50/16 |
| 2018/0156109 | A1* | 6/2018 | Suciu | B64D 27/20 |
| 2018/0170560 | A1* | 6/2018 | Conti | B64D 27/14 |
| 2018/0178920 | A1* | 6/2018 | Swann | B64D 31/06 |
| 2018/0251228 | A1* | 9/2018 | Sands | F02B 63/04 |
| 2018/0327104 | A1* | 11/2018 | Abele | B64D 27/20 |
| 2018/0370641 | A1* | 12/2018 | Dindar | F01D 15/10 |
| 2018/0370644 | A1* | 12/2018 | Coat | B64D 27/00 |
| 2019/0031363 | A1* | 1/2019 | Hoisington | B64D 35/00 |
| 2019/0344898 | A1* | 11/2019 | Scothern | B64D 27/24 |
| 2019/0382121 | A1* | 12/2019 | Schwarz | F02C 6/14 |
| 2019/0382123 | A1* | 12/2019 | Schwarz | H02K 11/0094 |

OTHER PUBLICATIONS

Wikipedia, Rejected takeoff, Apr. 10, 2015, https://web.archive.org/web/20150410225101/https://en.wikipedia.org/wiki/Rejected_takeoff. (Year: 2015), 1 page.

Wikipedia, Vspeeds, Apr. 10, 2015, http://web.archive.org/web/20150410000912/https://en.wikipedia.org/wik/V-speeds. (Year: 2015), 2 pages.

* cited by examiner

AIRCRAFT SYSTEM WITH DISTRIBUTED PROPULSION

BACKGROUND

Exemplary embodiments pertain to aircraft propulsion, and more particularly to an aircraft system with distributed propulsion between multiple engines and at least one thrust producing auxiliary fan module.

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection.

During flight, air passing over the fuselage of the aircraft forms a boundary layer immediately adjacent the fuselage due to friction between the air and the fuselage. The boundary layer resists forward motion through the air. In order to overcome the resistance of the boundary layer, the engines are typically oversized relative to a thrust requirement of the aircraft were the boundary layer to not be present.

BRIEF DESCRIPTION

Disclosed is a propulsion system for an aircraft that includes at least two gas turbine engines and at least one auxiliary propulsion fan. The at least one auxiliary propulsion fan is configured to selectively receive a motive force from either or both of the at least two gas turbine engines through at least one shaft operatively coupled to the at least one auxiliary propulsion fan.

In addition to one or more of the features described above or below, or as an alternative, further embodiments may include where the at least two gas turbine engines include a first gas turbine engine and a second gas turbine engine operably coupled through the at least one shaft to the at least one auxiliary propulsion fan.

In addition to one or more of the features described above or below, or as an alternative, further embodiments may include where at least one clutch is operably coupled between the first gas turbine engine, the second gas turbine engine, and the at least one shaft.

In addition to one or more of the features described above or below, or as an alternative, further embodiments may include where at least one disconnect is positioned between the first gas turbine engine, the second gas turbine engine, and the at least one auxiliary propulsion fan.

In addition to one or more of the features described above or below, or as an alternative, further embodiments may include where the at least one auxiliary propulsion fan is located in a tail section of the aircraft and further including at least one thrust reverser associated with the at least one auxiliary propulsion fan.

In addition to one or more of the features described above or below, or as an alternative, further embodiments may include where the at least one auxiliary propulsion fan includes a center rotating fan or at least two counter-rotating fans.

In addition to one or more of the features described above or below, or as an alternative, further embodiments may include an electric auxiliary fan driving motor configured to selectively receive electric power input from one or more electric power sources, and an auxiliary fan driving transmission mechanically coupled to the at least one shaft and the electric auxiliary fan driving motor, the auxiliary fan driving transmission configured to selectively drive rotation of the at least one auxiliary propulsion fan responsive to the motive force from either or both of the electric auxiliary fan driving motor and at least one of the at least two gas turbine engines.

In addition to one or more of the features described above or below, or as an alternative, further embodiments may include where the one or more electric power sources include a generator driven by an auxiliary power unit.

In addition to one or more of the features described above or below, or as an alternative, further embodiments may include where the one or more electric power sources include an energy storage system charged by one or more of the generator driven by the auxiliary power unit and an engine-driven generator driven by at least one of the at least two gas turbine engines.

In addition to one or more of the features described above or below, or as an alternative, further embodiments may include where the energy storage system includes one or more of: a battery system, a supercapacitor system, a hybrid storage system, and a fuel cell system.

Also disclosed is a method that includes combining a motive force from either or both of at least two gas turbine engines through a shared drive shaft. The method also includes providing the motive force to drive rotation of at least one auxiliary propulsion fan operatively coupled to shared drive shaft.

In addition to one or more of the features described above or below, or as an alternative, further embodiments may include where the at least two gas turbine engines include a first gas turbine engine and a second gas turbine engine operably coupled through the shared drive shaft to the at least one auxiliary propulsion fan.

In addition to one or more of the features described above or below, or as an alternative, further embodiments may include controlling engagement of at least one clutch operably coupled between the first gas turbine engine, the second gas turbine engine, and the shared drive shaft.

In addition to one or more of the features described above or below, or as an alternative, further embodiments may include controlling engagement of at least one disconnect between the first gas turbine engine, the second gas turbine engine, and the at least one auxiliary propulsion fan.

In addition to one or more of the features described above or below, or as an alternative, further embodiments may include where the at least one auxiliary propulsion fan includes a center rotating fan or at least two counter-rotating fans located in a tail section of an aircraft, and the method further includes controlling at least one thrust reverser associated with the at least one auxiliary propulsion fan.

In addition to one or more of the features described above or below, or as an alternative, further embodiments may include controlling an electric auxiliary fan driving motor responsive to electric power input from one or more electric power sources, and selectively driving rotation of the at least one auxiliary propulsion fan responsive to the motive force from either or both of the electric auxiliary fan driving motor and at least one of the at least two gas turbine engines through an auxiliary fan driving transmission mechanically coupled to the shared drive shaft and the electric auxiliary fan driving motor.

In addition to one or more of the features described above or below, or as an alternative, further embodiments may include where the one or more electric power sources include an energy storage system and the method further includes charging the energy storage system by one or more of a generator driven by an auxiliary power unit and an engine-driven generator driven by at least one of the at least two gas turbine engines, where the energy storage system includes one or more of: a battery system, a supercapacitor system, a hybrid storage system, and a fuel cell system.

Further disclosed is a propulsion system for an aircraft. The propulsion system includes a first gas turbine engine, a second gas turbine engine, a mechanical power mixing means operably coupled to the first gas turbine engine and the second gas turbine engine, an auxiliary fan driving motor, and an auxiliary propulsion fan. The auxiliary propulsion fan is configured to selectively receive a motive force from either or both of the mechanical power mixing means and the auxiliary fan driving motor.

In addition to one or more of the features described above or below, or as an alternative, further embodiments may include where the mechanical power mixing means includes a first engine drive shaft coupled through a first clutch to a gearbox, a second engine drive shaft coupled through a second clutch to the gearbox, and a shared drive shaft operably coupled between the gearbox and an auxiliary fan driving transmission operably coupled to the auxiliary propulsion fan.

In addition to one or more of the features described above or below, or as an alternative, further embodiments may include a first bevel gearbox operably coupled between the first gas turbine engine and the first engine drive shaft, and second bevel gearbox operably coupled between the second gas turbine engine and the second engine drive shaft.

A technical effect of systems and methods is achieved by providing a distributed propulsion system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
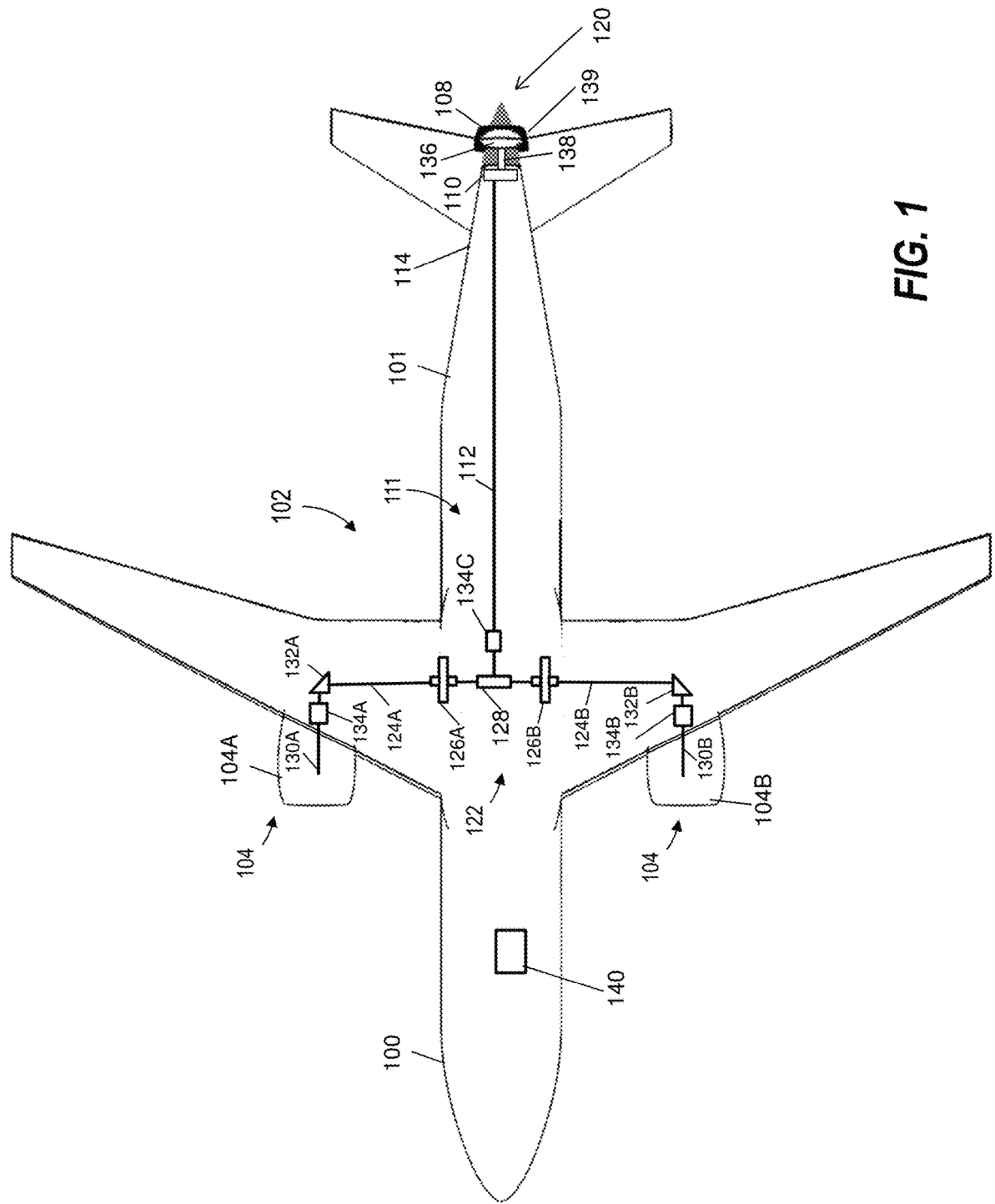
FIG. 1 is a schematic illustration of an aircraft including a propulsion system in accordance with an embodiment of the disclosure.

FIG. 1 schematically illustrates an exemplary aircraft 100 with a fuselage 101 and a propulsion system 102. The propulsion system 102 includes at least two gas turbine engines 104 and an auxiliary propulsion fan 108. The gas turbine engines 104 can be mounted in various configurations, such as under-wing mounted, top-of wing mounted, fuselage mounted, or other such configurations. The auxiliary propulsion fan 108 can be driven by a combination of power sources. In the example of FIG. 1, the auxiliary propulsion fan 108 is located in a tail section 114 of the aircraft 100 and can be mechanically driven through an auxiliary fan driving transmission 110 at the aft end 120 of the aircraft 100. Although a single instance of the auxiliary propulsion fan 108 is depicted in the tail section 114 of FIG. 1, it will be understood that the auxiliary propulsion fan 108 or multiple instances of the auxiliary propulsion fan 108 can be installed at various locations on the aircraft 100, such as along or within the fuselage 101. In the example of FIG. 1, the aircraft 100 includes a pair of gas turbine engines 104, depicted as a first gas turbine engine 104A and a second gas turbine engine 104B. The combination of the first gas turbine engine 104A, the second gas turbine engine 104B, and the auxiliary propulsion fan 108 provide distributed propulsion for the aircraft 100. An auxiliary fan driving transmission 110 can be mechanically coupled to the gas turbine engines 104 as distributed propulsion power sources for the auxiliary propulsion fan 108. The auxiliary fan driving transmission 110 is configured to selectively receive a motive force from either or both of the gas turbine engines 104 and, in some embodiments, one or more additional motive force sources (e.g., as further described in reference to FIGS. 3 and 4). The auxiliary fan driving transmission 110 may also include gearing, for example, to support desired rotational characteristics of the auxiliary propulsion fan 108.

The propulsion system 102 can include a mechanical power mixing means 122 operably coupled to each of the gas turbine engines 104. The mechanical power mixing means 122 can be operably coupled to the auxiliary fan driving transmission 110 through a shared drive shaft 112 of a shaft system 111. The mechanical mixing means 122 can include a first engine drive shaft 124A coupled through a first clutch 126A to a gearbox 128 and a second engine drive shaft 124B coupled through a second clutch 126B to the gearbox 128, where the shared drive shaft 112 is operably coupled between the gearbox 128 and the auxiliary fan driving transmission 110. In the example of FIG. 1, the first clutch 126A and the second clutch 126B are each one-way clutches that can enable motive force balancing between the first and second gas turbine engines 104A, 104B and/or single engine operation of the shared drive shaft 112. To transfer power from the gas turbine engines 104 to the mechanical mixing means 122, one or more bevel gearboxes can be used. In the example of FIG. 1, a first engine coupling 130A, such as a tower shaft interface, can extract rotational energy from the first gas turbine engine 104A and drive rotation of the first engine drive shaft 124A through a first bevel gearbox 132A, and a second engine coupling 130B can extract rotational energy from the second gas turbine engine 104B and drive rotation of the second engine drive shaft 124B through a second bevel gearbox 132B. The first and second bevel gearboxes 132A, 132B can be air cooled and oil-filled with extended surfaces, for example. A combination of the first and second engine couplings 130A and 130B, the first and second engine drive shafts 124A and 124B, and the shared drive shaft 112 may be referred to as the shaft system 111.

The term clutch is being used here in a general sense to describe an interfacing mechanical device that allows a first shaft to turn at a different speed than a second, connected shaft where one or the other may be the faster turning shaft. Other devices that are usually not described as a clutch can be used to accomplish this independent rotation across that interfacing device including the circumstance where one of the shafts is turning and the other is disconnected and not turning at all.

In some embodiments, the propulsion system 102 includes at least one disconnect between the first gas turbine engine 104A, the second gas turbine engine 104B, and the auxiliary fan driving transmission 110, such as clutches 134A, 134B, 134C. For example, clutch 134A can be located between the first engine coupling 130A and the first bevel gearbox 132A. Clutch 134B can be located between the second engine coupling 130B and the second bevel gearbox 132B. Clutch 134C can be located between the gearbox 128 and the shared drive shaft 112. Other types and/or locations of mechanical disconnects to isolate motive force transmission are contemplated.

At least one controller 140 can control aspects of the propulsion system 102. The controller 140 can include one or more channels and/or processing system components within the aircraft 100, such as a memory system to store instructions that are executed by a processing system of the controller 140. The executable instructions may be stored or organized in any manner and at any level of abstraction, such as in connection with a controlling and/or monitoring operation of the propulsion system 102. The processing system of the controller 140 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system of the controller 140 may include random access memory (RAM), read only memory (ROM), or other electronic, optical, magnetic, or any other computer readable medium onto which is stored data and control algorithms in a non-transitory form. The controller 140 may also interface with various sensors, actuators, air data systems, and other such systems of the aircraft 100 known in the art to accept various inputs and adjust performance of the propulsion system 102 accordingly.

During flight operations, such as during a cruise mode of operations, a boundary layer forms along the surface of the fuselage 101. The boundary layer creates drag and resists forward motion of the aircraft 100. Conventional aircraft size the gas turbine engines 104 to overcome the boundary layer drag during operation of the aircraft 100. This oversizing of the gas turbine engines 104 can result in decreases in the efficiency of engine operation.

The auxiliary propulsion fan 108 may have various design features. In the example of FIG. 1, the auxiliary propulsion fan 108 includes two counter-rotating fans 136 driven by at least one fan drive shaft 138 coupled to an output of the auxiliary fan driving transmission 110. Counter rotation can eliminate the need for a static exit guide vane, which may be supported by a bearing compartment. In some embodiments, the auxiliary propulsion fan 108 is shrouded by a nacelle 139 or other structure. It will be understood that the aircraft 100 includes additional systems not depicted in FIG. 1.

The presence of the auxiliary propulsion fan 108 in a tail section 114 at the aft end 120 of the aircraft 100 can ingest the drag on the fuselage 101 and decrease the thrust requirement of the gas turbine engines 104. In some examples, the auxiliary propulsion fan 108 can generate up to 15% of the required thrust power for the aircraft 100. In such an example, the gas turbine engines 104 can be downsized to a corresponding 85% of the size that would be required absent the auxiliary propulsion fan 108. In other embodiments, the auxiliary propulsion fan 108 can generate up to 33% of the required thrust power for the aircraft 100. The auxiliary propulsion fan 108 can provide supplemental power for various flight phases, such as takeoff, to reduce fuel burn and temperatures of the gas turbine engines 104. When multiple instances of the auxiliary propulsion fan 108 are utilized, various thrust producing ratios between the auxiliary propulsion fans 108 and one or more gas turbine engines 104 can be achieved while maintaining a minimum total thrust required from all sources of thrust on the aircraft 100 to perform within the limitation of such conditions as runway length with an engine inoperative. Further, the thrust provided by the auxiliary propulsion fan 108 can be reduced/modified depending upon the health status and/or capability of the propulsion system 102. For example, if one or more of the gas turbine engines 104 is not operational or experiences a fault during takeoff phase, the auxiliary propulsion fan 108 can be driven primarily by an auxiliary power source (e.g., an electric auxiliary fan driving motor 116 of FIGS. 3 and 4) to provide additional power to contribute to the takeoff power required to operate within the limits of the given runway and ambient temperature.

Figure 2:
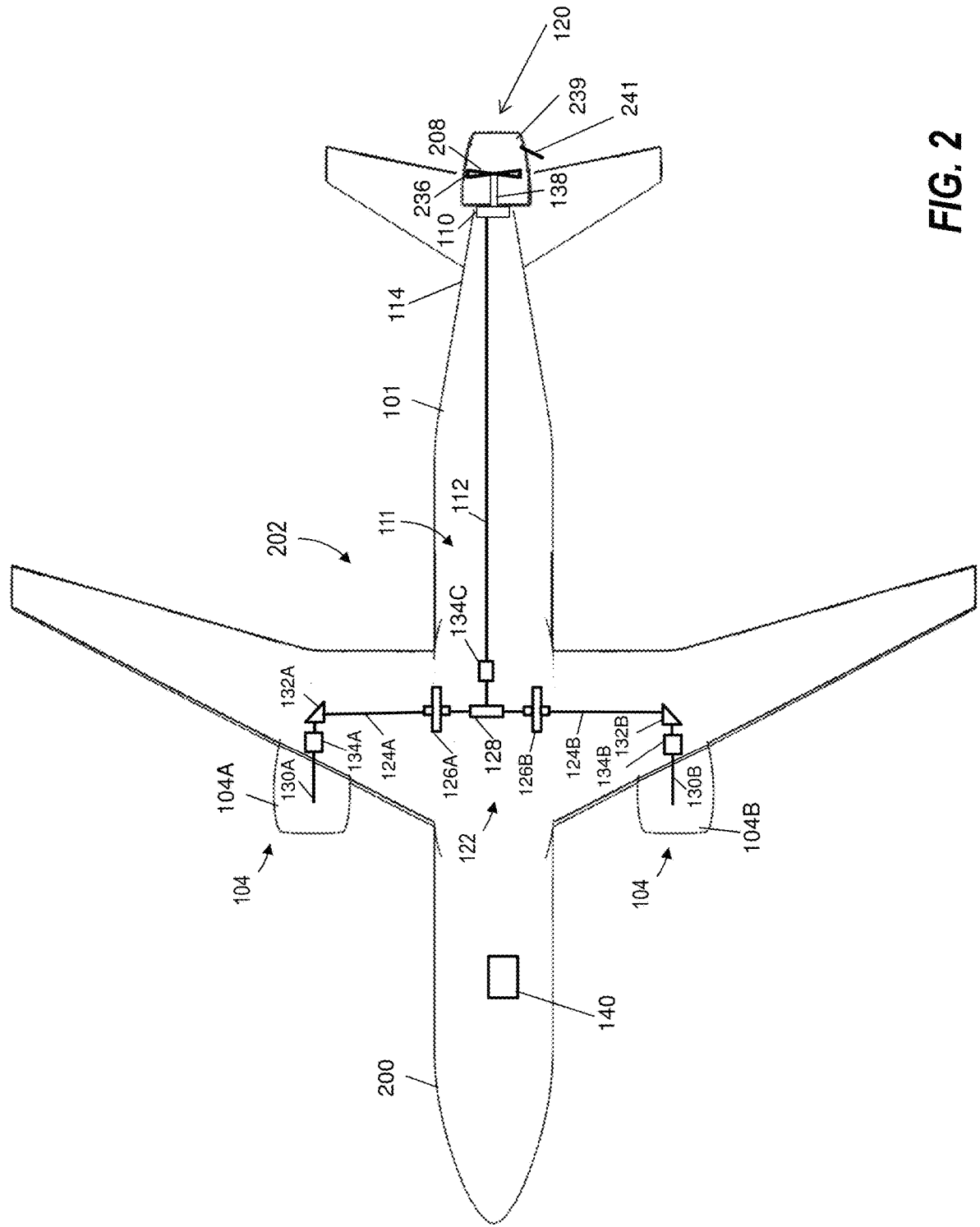
FIG. 2 is a schematic illustration of an aircraft including a propulsion system in accordance with an embodiment of the disclosure.

FIG. 2 schematically illustrates an exemplary aircraft 200 as an alternate embodiment of the aircraft 100 of FIG. 1, where like elements have like numbers as described with respect to FIG. 1. The aircraft 200 includes a propulsion system 202 with gas turbine engines 104, mechanical mixing means 122, and auxiliary fan driving transmission 110 mechanically coupled to the gas turbine engines 104. Rather than including counter-rotating fans 136 as in the auxiliary propulsion fan 108 of FIG. 1, the propulsion system 202 includes an auxiliary propulsion fan 208 with a center rotating fan 236 driven by a fan drive shaft 138 coupled to an output of the auxiliary fan driving transmission 110. The center rotating fan 236 can be a variable pitch center rotating fan and/or may include variable guide vanes with a reversing function. A nacelle 239 external to the auxiliary propulsion fan 208 can include one or more thrust reversers 241. The thrust reverser 241 can be a cascade reverser, a bucket-type reverser, or other configuration known in the art. In some embodiments, the thrust reversers 241 can be sized for the aircraft 200 such that separate thrust reversers are not needed on the gas turbine engines 104. It will be understood that the aircraft 200 includes additional systems not depicted in FIG. 2.

Figure 3:
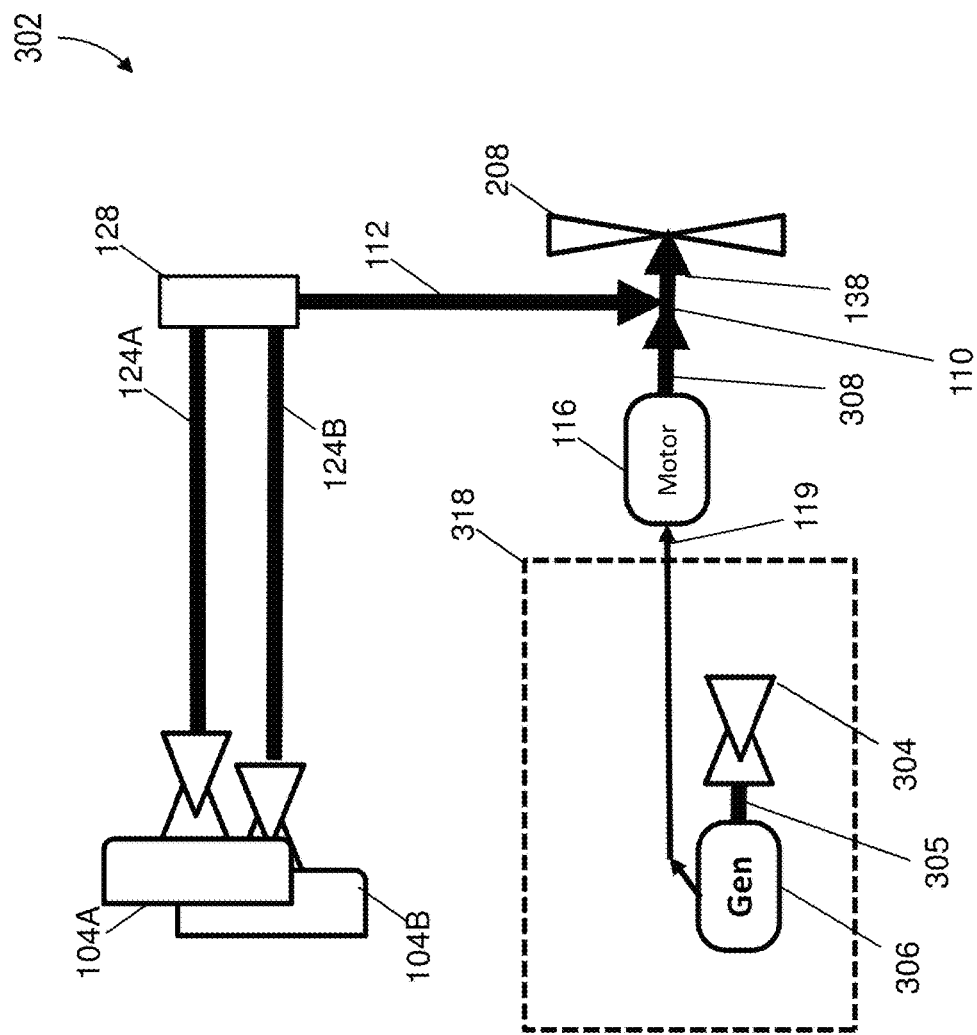
FIG. 3 is a schematic illustration of a propulsion system in accordance with an embodiment of the disclosure.

FIG. 3 is a schematic illustration of a propulsion system 302 in accordance with an embodiment. The propulsion system 302 depicts a simplified example of the propulsion system 202 of FIG. 2 including first and second gas turbine engines 104A, 104B coupled to the auxiliary fan driving transmission 110 through shared drive shaft 112 and an electric auxiliary fan driving motor 116 (which may also be referred to as an auxiliary fan driving motor) coupled to the auxiliary fan driving transmission 110 through a motor output shaft 308. In FIG. 3, an electric power source 318 includes an auxiliary power unit 304 coupled by a mechanical coupling 305 to a generator 306 that supplies electricity to the electric auxiliary fan driving motor 116 through an electrical coupling 119. The auxiliary power unit 304 can be a reduced size gas turbine engine as compared to the gas turbine engines 104, where the mechanical coupling 305 drives rotation of a rotor of the generator 306. The output of the generator 306 on the electrical coupling 119 can be conditioned to control the electric auxiliary fan driving motor 116, for instance, using an inverter/motor drive (e.g., inverter/motor drive 504 of FIG. 5) according to known motor control techniques. Operation of the auxiliary power unit 304 and control of the electric auxiliary fan driving motor 116 may be performed by the controller 140 of FIGS. 1 and 2 or other controllers (not depicted). As a further variation, the auxiliary power unit 304 may drive the motor output shaft 308, where the auxiliary power unit 304 is configured as an auxiliary fan driving motor with respect to the auxiliary propulsion fan 208.

In embodiments, the propulsion system 302 is a hybrid electric system, where the auxiliary propulsion fan 208 is selectively powered by either or both electrically driven and mechanically driven motive forces. The controller 140 of FIG. 2 can determine when to drive rotation of the electric auxiliary fan driving motor 116 to supplement the mechanically driven motive force from the gas turbine engines 104 provided through the shared drive shaft 112. The shared powering through electrical and mechanical means can provide advantages over using only electrical or only mechanical power. For example, the size and electrical current requirements of the electric auxiliary fan driving motor 116 can be reduced in a hybrid configuration as compared to an all-electric configuration. Electrical coupling 119 between the electric power source 318 and the electric auxiliary fan driving motor 116 may have a reduced length and/or power delivery requirements when the electric auxiliary fan driving motor 116 is designed to share the burden of driving the auxiliary propulsion fan 108 as compared to electrical power requirements from generators driven by the gas turbine engines 104. Higher current capacity wiring can result in added weight, reduced efficiency, and increased cross-coupling risks in an all-electric solution as compared to a hybrid solution. Depending upon an aircraft operating regime, system health, operating environment constraints, and other factors, the ratio of motive force provided by the gas turbine engines 104 and the electric auxiliary fan driving motor 116 through the auxiliary fan driving transmission 110 can be adjusted, for instance, by the controller 140, and/or other components (not depicted). For example, if the auxiliary power unit 304 is degraded or output of the generator 306 is low, the thrust provided by the auxiliary propulsion fan 208 may be reduced and one or more of the gas turbine engines 104 can be driven to a higher thrust setting, meaning that one or more of the gas turbine engines 104 can be operated with less thrust derate up to zero percent thrust derate, which is the full-rated takeoff thrust for the ambient temperature. In some embodiments, the propulsion system 102 of FIG. 1 can be modified to incorporate components of the propulsion system 302 of FIG. 3, such as the electric power source 318 and the electric auxiliary fan driving motor 116.

Figure 4:
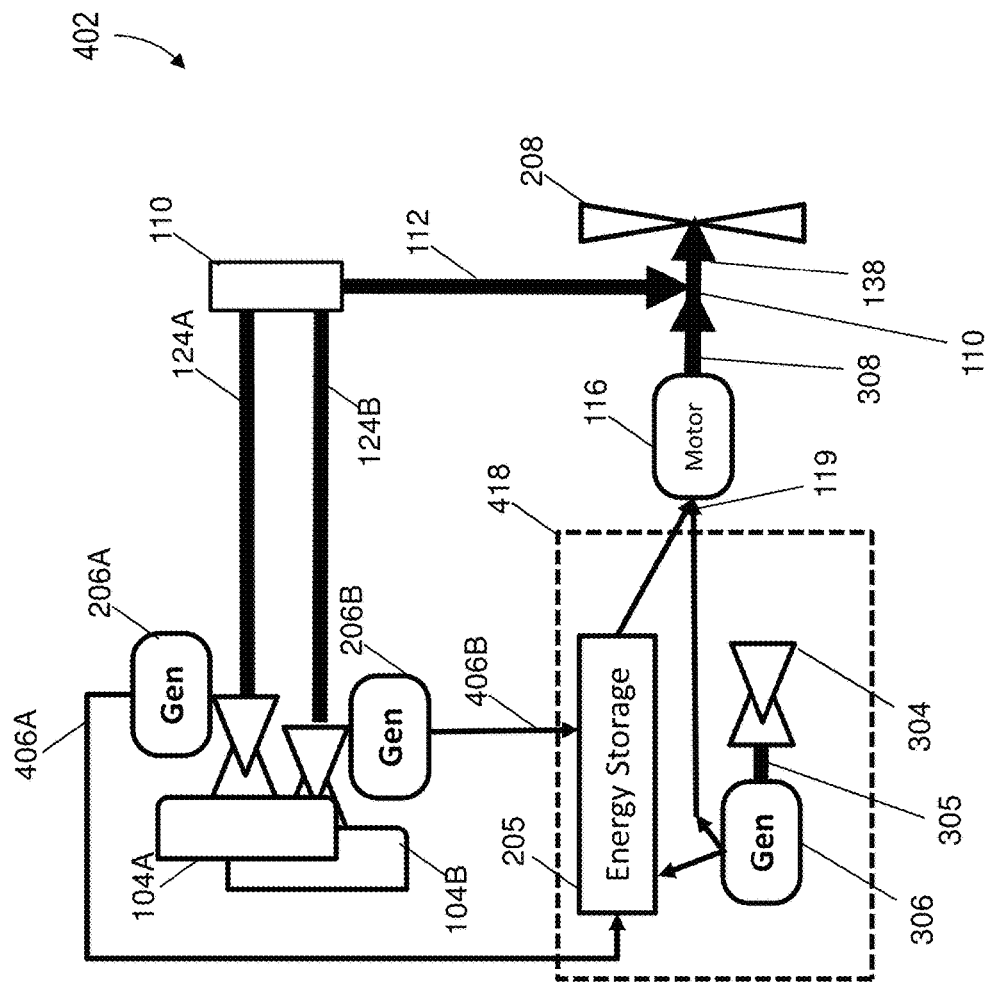
FIG. 4 is a schematic illustration of a propulsion system in accordance with an embodiment of the disclosure.

FIG. 4 is a schematic illustration of a propulsion system 402 in accordance with an embodiment. The propulsion system 402 is an alternate embodiment of the propulsion system 302 of FIG. 3. As a further variation to the electric power source 318 of FIG. 3, electric power source 418 of FIG. 4 includes an energy storage system 205. The energy storage system 205 can include one or more of a battery system, a supercapacitor system, a hybrid storage system (e.g., capacitors and batteries), a fuel cell system, and/or other energy storage components known in the art. The energy storage system 205 can be recharged by the generator 306 driven by the auxiliary power unit 304 and/or by generators 206A, 206B driven by gas turbine engines 104A, 104B respectively. For example, an electrical coupling 406A from generator 206A can provide current to selectively recharge the energy storage system 205, and an electrical coupling 406B from generator 206B can provide current to selectively recharge the energy storage system 205 depending on operating conditions of the gas turbine engines 104A, 104B. For instance, during operating regimes where a reduced level of thrust is needed from the gas turbine engines 104A, 104B, recharging of the energy storage system 205 can be performed. Depending on the current demand of the electric auxiliary fan driving motor 116, either or both of the energy storage system 205 and the generator 306 driven by the auxiliary power unit 304 can output electric current on the electrical coupling 119 to the electric auxiliary fan driving motor 116. For example, during takeoff and climb, both the energy storage system 205 and the generator 306 may source current to the electric auxiliary fan driving motor 116. Alternatively, either the energy storage system 205 or the generator 306 may selectively source current to the electric auxiliary fan driving motor 116, for instance, depending on the current demand and health/capacity of the energy storage system 205 and the generator 306. Although depicted in FIG. 4, embodiments can omit the generators 206A, 206B and/or the electrical couplings 406A, 406B, where the energy storage system 205 is recharged only by the generator 306 or another source (not depicted). In some embodiments, the propulsion system 102 of FIG. 1 can be modified to incorporate components of the propulsion system 402 of FIG. 4, such as the generators 206A, 206B, electric power source 418, and the electric auxiliary fan driving motor 116.

Figure 5:
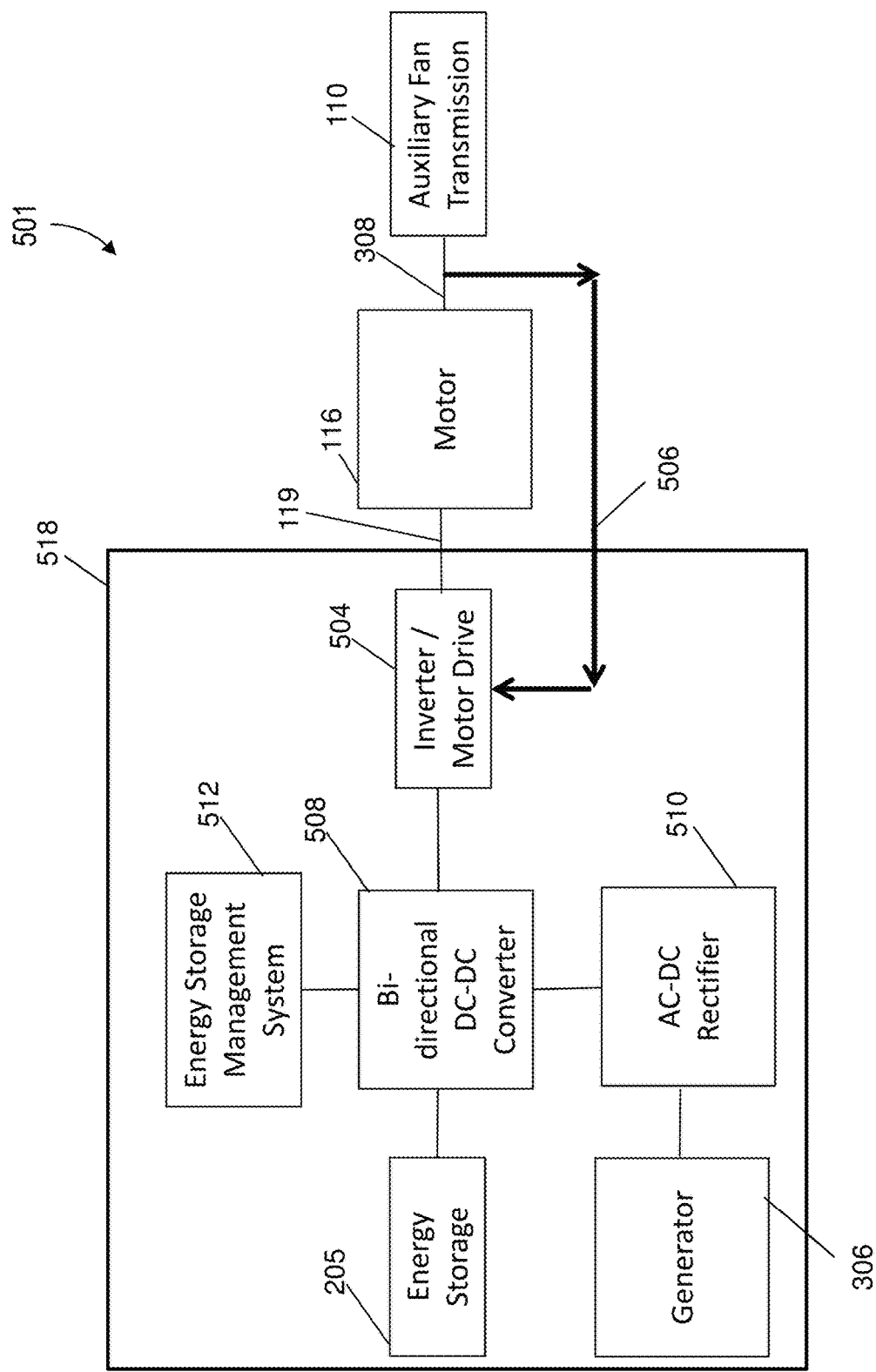
FIG. 5 is a schematic illustration of an electric auxiliary fan driving motor system in accordance with an embodiment of the disclosure.

FIG. 5 is a schematic illustration of an electric auxiliary fan driving motor system 501 as a further variation of an electrical drive system for the electric auxiliary fan driving motor 116. In the example of FIG. 5, electric power source 518 supplies electricity to the electric auxiliary fan driving motor 116 through the electrical coupling 119. The electric power source 518 can include an inverter/motor drive 504 operable to drive the electric auxiliary fan driving motor 116 to control the motor output shaft 308, for example, based on feedback 506, which may be a rotational speed of the motor output shaft 308 or other sensed parameter. The inverter/motor drive 504 may be configured as a variable speed/frequency drive to support a range of operating speeds of the electric auxiliary fan driving motor 116. The inverter/motor drive 504 can use known motor control techniques to control the speed and/or torque produced by the electric auxiliary fan driving motor 116. In the example of FIG. 5, the inverter/motor drive 504 is operable on direct current (DC) voltage received from a DC-to-DC converter 508. The DC-to-DC converter 508 can be a bi-directional converter to supply load power and voltage to the inverter/motor drive 504 and/or charge the energy storage system 205 as needed. Electrical power delivered by the generator 306 and/or the generators 206A, 206B of FIG. 4 may be alternating current (AC). One or more AC-DC rectifiers 510 can convert the AC to DC for the DC-to-DC converter 508. Differences in the DC voltage levels of the energy storage system 205, inverter/motor drive 504, and AC-DC rectifiers 510 can be managed by power conditioning circuitry of the DC-to-DC converter 508. The electric power source 518 can also include an energy storage management system 512, which may perform temperature monitoring of the energy storage system 205 and control DC-DC conversion performed by the DC-to-DC converter 508. Although depicted separately, the energy storage management system 512 can be integrated with the energy storage system 205 or the DC-to-DC converter 508.

Figure 6:
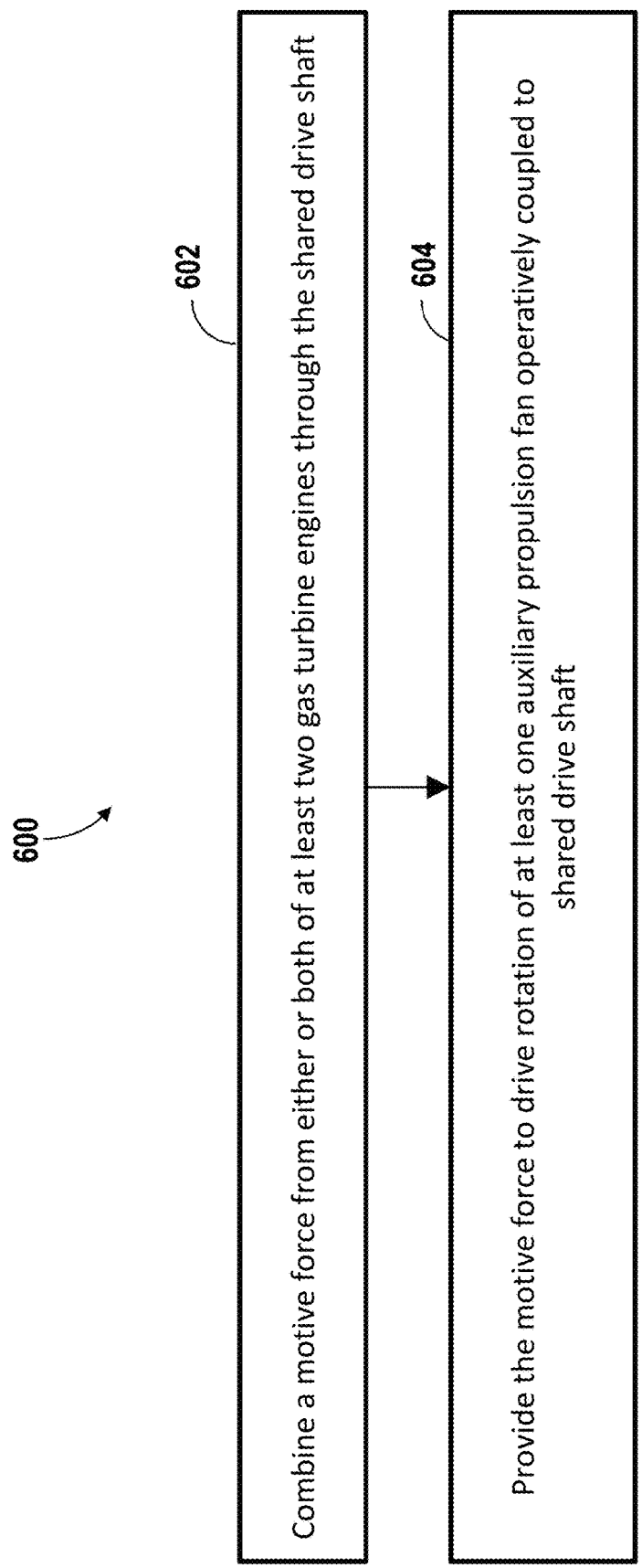
FIG. 6 is a flow chart illustrating a method in accordance with an embodiment of the disclosure.

FIG. 6 is a flow chart illustrating a method 600 of operating a propulsion system of an aircraft, such as the propulsion system 102 of aircraft 100 of FIG. 1, in accordance with an embodiment. The method 600 of FIG. 6 is described in reference to FIGS. 1-6 and may be performed with an alternate order and include additional steps. The method 600 can be performed, for example, by the propulsion systems 102, 202, 302, 402 of FIGS. 1-4.

At block 602, a motive force from either or both of at least two gas turbine engines 104A, 104B is combined through the shared drive shaft 112. At block 604, the motive force is provided to drive rotation of at least one auxiliary propulsion fan 108 operatively coupled to shared drive shaft 112. For example, a first gas turbine engine 104A and a second gas turbine engine 104B can be operably coupled through the shared drive shaft 112 to the at least one auxiliary propulsion fan 108. The shared drive shaft 112 can provide a gas turbine engine motive force to an auxiliary fan driving transmission 110 operatively coupled to at least one auxiliary propulsion fan 108.

In some embodiments, the controller 140 can control engagement of at least one clutch 126A, 126B operably coupled between the first gas turbine engine 104A, the second gas turbine engine 104B, and the shared drive shaft 112. The controller 140 may control engagement of at least one disconnect, such as clutches 134A, 134B, 134C, between the first gas turbine engine 104A, the second gas turbine engine 104B, and the at least one auxiliary propulsion fan 108. The controller 140 may control at least one thrust reverser associated with the at least one auxiliary propulsion fan 108, such as the auxiliary propulsion fan 208. The controller 140 can control an electric auxiliary fan driving motor 116 responsive to electric power input from one or more electric power sources 318, 418, 518. The controller 140 can selectively drive rotation of the at least one auxiliary propulsion fan 108 responsive to the motive force from either or both of the electric auxiliary fan driving motor 116 and at least one of the at least two gas turbine engines 104A, 104B through an auxiliary fan driving transmission 110 mechanically coupled to the shared drive shaft 112 and the electric auxiliary fan driving motor 116. An energy storage management system 512 can control charging the energy storage system 205 by one or more of a generator 306 driven by an auxiliary power unit 304 and an engine-driven generator 206A, 206B driven by at least one of the at least two gas turbine engines 104A, 104B.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A propulsion system for an aircraft, the propulsion system comprising:
    at least two gas turbine engines;
    at least one propulsion fan configured to selectively receive a motive force from either or both of the at least two gas turbine engines through at least one shaft operatively coupled to the at least one propulsion fan;
    an electric fan driving motor configured to selectively receive electric power input from one or more electric power sources; and
    a fan driving transmission mechanically coupled to the at least one shaft and the electric fan driving motor, the fan driving transmission configured to selectively drive rotation of the at least one propulsion fan responsive to the motive force from either or both of the electric fan driving motor and at least one of the at least two gas turbine engines.

2. The propulsion system of claim 1, wherein the at least two gas turbine engines comprise a first gas turbine engine and a second gas turbine engine operably coupled through the at least one shaft to the at least one propulsion fan.

3. The propulsion system of claim 2, further comprising at least one clutch operably coupled between the first gas turbine engine, the second gas turbine engine, and the at least one shaft.

4. The propulsion system of claim 2, further comprising at least one disconnect between the first gas turbine engine, the second gas turbine engine, and the at least propulsion fan.

5. The propulsion system of claim 1, wherein the at least one propulsion fan is located in a tail section of the aircraft and further comprising at least one thrust reverser associated with the at least one propulsion fan.

6. The propulsion system of claim 1, wherein the at least one propulsion fan comprises a center rotating fan or at least two counter-rotating fans.

7. The propulsion system of claim 1, wherein the one or more electric power sources comprise a generator driven by an auxiliary power unit.

8. The propulsion system of claim 7, wherein the one or more electric power sources comprise an energy storage system charged by one or more of the generator driven by the auxiliary power unit and an engine-driven generator driven by at least one of the at least two gas turbine engines.

9. The propulsion system of claim 8, wherein the energy storage system comprises one or more of: a battery system, a supercapacitor system, a hybrid storage system, and a fuel cell system.

10. A method comprising:
    combining a motive force from either or both of at least two gas turbine engines through a shared drive shaft;
    providing the motive force to drive rotation of at least one propulsion fan operatively coupled to shared drive shaft;
    controlling an electric fan driving motor responsive to electric power input from one or more electric power sources; and
    selectively driving rotation of the at least one propulsion fan responsive to the motive force from either or both of the electric fan driving motor and at least one of the at least two gas turbine engines through a fan driving transmission mechanically coupled to the shared drive shaft and the electric fan driving motor.

11. The method of claim 10, wherein the at least two gas turbine engines comprise a first gas turbine engine and a second gas turbine engine operably coupled through the shared drive shaft to the at least one propulsion fan.

12. The method of claim 11, further comprising:
controlling engagement of at least one clutch operably coupled between the first gas turbine engine, the second gas turbine engine, and the shared drive shaft.

13. The method of claim 11, further comprising:
controlling engagement of at least one disconnect between the first gas turbine engine, the second gas turbine engine, and the at least one propulsion fan.

14. The method of claim 10, wherein the at least one propulsion fan comprises a center rotating fan or at least two counter-rotating fans located in a tail section of an aircraft and further comprising:
controlling at least one thrust reverser associated with the at least one propulsion fan.

15. The method of claim 10, wherein the one or more electric power sources comprise an energy storage system, and further comprising:
charging the energy storage system by one or more of a generator driven by an auxiliary power unit and an engine-driven generator driven by at least one of the at least two gas turbine engines, wherein the energy storage system comprises one or more of: a battery system, a supercapacitor system, a hybrid storage system, and a fuel cell system.

16. A propulsion system for an aircraft, the propulsion system comprising:
a first gas turbine engine;
a second gas turbine engine;
a mechanical power mixing means operably coupled to the first gas turbine engine and the second gas turbine engine;
a fan driving motor; and
a propulsion fan configured to selectively receive a motive force from either or both of the mechanical power mixing means and the fan driving motor.

17. The propulsion system of claim 16, wherein the mechanical power mixing means comprises a first engine drive shaft coupled through a first clutch to a gearbox, a second engine drive shaft coupled through a second clutch to the gearbox, and a shared drive shaft operably coupled between the gearbox and a fan driving transmission operably coupled to the propulsion fan.

18. The propulsion system of claim 17, further comprising a first bevel gearbox operably coupled between the first gas turbine engine and the first engine drive shaft, and second bevel gearbox operably coupled between the second gas turbine engine and the second engine drive shaft.

* * * * *